Dec. 25, 1956   H. HERLACH   2,775,143
TRAINING-MECHANISM HANDWHEEL
Filed May 2, 1952   2 Sheets-Sheet 1

INVENTOR:
Heinrich Herlach
BY
Richard y Geier
ATTORNEYS

Dec. 25, 1956            H. HERLACH            2,775,143
TRAINING-MECHANISM HANDWHEEL
Filed May 2, 1952            2 Sheets-Sheet 2
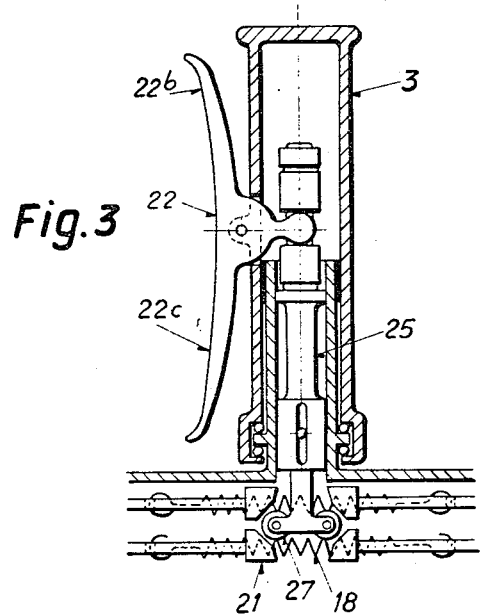
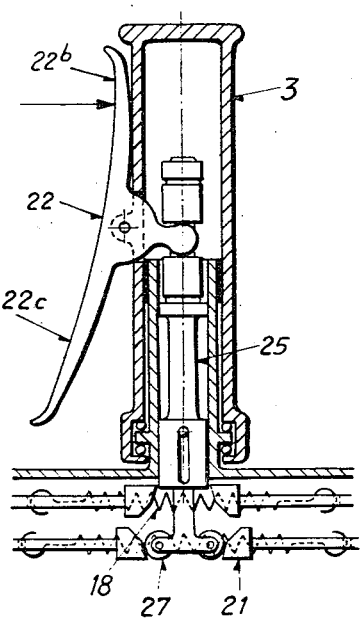
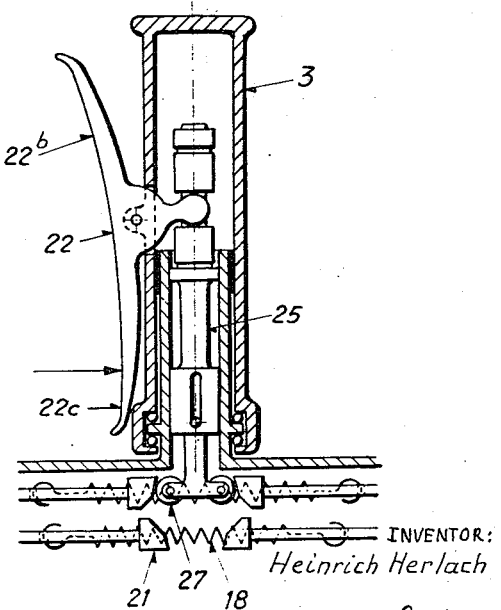
INVENTOR:
Heinrich Herlach
BY
ATTORNEYS

United States Patent Office 2,775,143
Patented Dec. 25, 1956

2,775,143

TRAINING-MECHANISM HANDWHEEL

Heinrich Herlach, Zurich, Switzerland, assignor to Machine Tool Works Oerlikon, Administration Company, Zurich-Oerlikon, Switzerland, a Swiss company Application May 2, 1952, Serial No. 285,727

Claims priority, application Switzerland May 5, 1951

1 Claim. (Cl. 74—750)

The present invention relates to a training-mechanism handwheel which can be joltlessly adjusted to various speeds of training.

The training-mechanism handwheel, the handle of which can be selectively coupled via friction clutches to a gear train for a high or a low training speed by means of a selector lever arranged on the handle, the friction couplings consisting of arms movably connected to the handle body, with brake linings which are pressed against clutch plates of the gear trains by springs, is characterized by the fact, that two friction clutches are provided of which one or the other is always released through a ram in the two extreme positions of the selector lever while in the intermediate position of the lever both friction clutches are engaged and lock the handwheel.

The drawing illustrates a typical embodiment of the invention. In the drawing.

Figure 1:
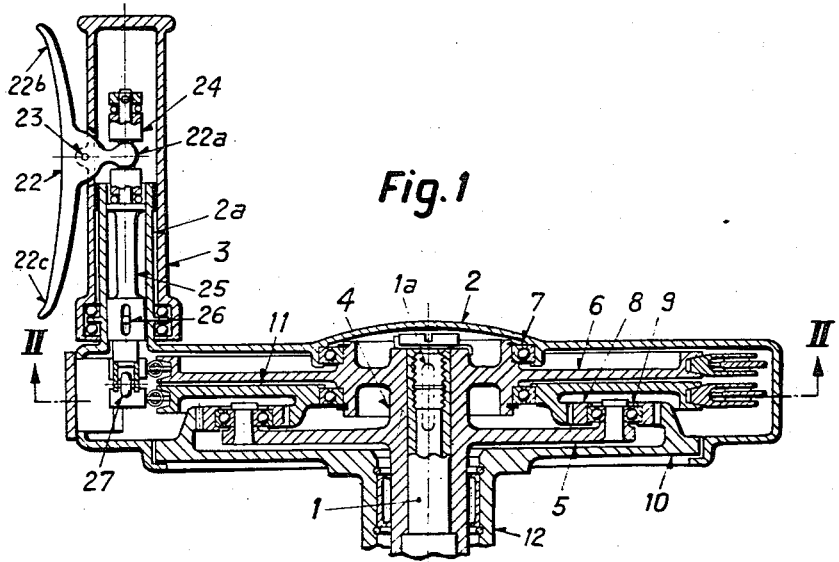
Figure 1 is a vertical sectional view of the training-mechanism handwheel along the line I—I of Fig. 2.
Figure 2:
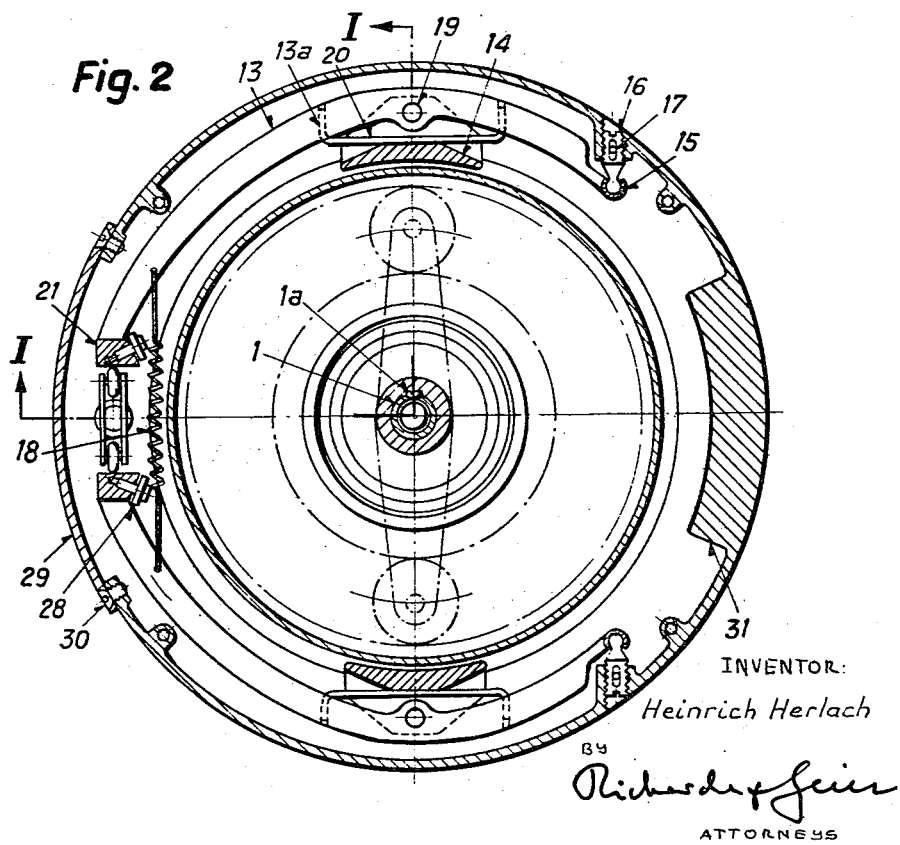
Figure 2 is a horizontal sectional view of the training-mechanism handwheel along the line II—II of Fig. 1, and Figures 3 to 5 are vertical sectional views of the handle with the selector lever in different positions.

The handwheel mounted on the shaft 1 has a casing 2. On a projection 2a of the casing the handle 3 is rotatably mounted. Secured by a key 1a to the shaft is the hub 4 which carries a planet-wheel bracket 5 and a clutch plate 6. The casing 2 is mounted on the hub 4 by means of the bearing 7. Two spur gears 8 are rotatably mounted on the planet-wheel bracket by means of bearings 9. The spur gears 8 engage with a toothed ring 10 and a clutch plate 11 movably mounted on the hub 4. The ring 10 is rigidly mounted on the fixed bracket 12.

The clutch plates 6, 11 are provided at their peripheries with grooves of V-shaped cross-section in which friction members engage. The said friction members consist of segment-shaped supports 13 carrying friction linings 14. The supports 13 are mounted at one end in the casing 2 by means of ball-and-socket joints 15. The ball-and-socket points are arranged on screws 16 by means of which they can be adjusted. The screws 16 are secured by a pin 17 against rotation in their set positions. Two symmetrically opposed friction members are provided for each clutch plate. The movable, free ends of the supports 13 are connected by a tension spring 18 which keeps the two friction elements in engagement with the corresponding clutch plate. The friction shoes 14 are each pivotally mounted on a spindle 19 and are held in their normal positions by a pretensioned wire spring 20 which engages in holes 13a drilled in the support 13. Owing to this arrangement, the shoes 14 are self-adjusting.

At their free ends the supports 13 each have a cam 21 through which the friction members can be released. For this purpose the handle 3 is provided with a two-armed lever 22 pivoting on a pivot 23. The lever 22 engages by an extension 22a, via rotatable stops 24, with a ram 25 arranged for longitudinal displacement. The ram 25 is prevented from rotary movement during its stroke by a pin 26 engaging a slot. As shown in Figures 3 to 5, the ram 25 carries at its lower end two rollers 27 which are provided for engagement with the cams 21 of the clutch parts 13.

In the normal position of the lever 22, the rollers 27 of the ram 25 are freely suspended between the cams 21. If the arm 22b of the lever 22 is actuated, the rollers 27 force apart the cams of the lower clutch members, thereby releasing the lower clutch. If the ram is actuated by depressing the lever arm 22c, the upper clutch is released. For the purpose of absorbing the lateral forces produced by the pressure of the roller 27 on the oblique faces of the cams 21, rollers 28 are provided on said cams, which rollers brace the supports 13 against the wall of the casing. For purposes of maintenance and inspection, the handwheel body 2 is provided in the region of the handle with a removable coverplate 29 secured by screws 30. The mass of the handle is counterbalanced by the counterweight 31 in the handwheel body.

The following is a description of the manner in which the handwheel functions: If the lever 22 is not operated, the ram 25 is in its neutral position, with the rollers 27 suspended freely between the pairs of cams 21. By the springs 18, the two clutches are kept in engagement with the corresponding clutch plates. As a result the clutch plates 6 and 11 are coupled together according to the frictional force, and rotation of the handwheel is possible only by overcoming this friction (Fig. 3).

If now the inner arm 22c of the lever 22 is pressed against the handle 3, the ram 25 is drawn outwards and the rollers 27 force the cams 21 of the upper clutch apart against the pressure of the spring 18. Through the pivoting of the support 13 about the ball-and-socket joint 15, the friction cheeks 14 are lifted from the plate 6. As a result the rotation of the handle 3 and of the casing 2 is transmitted through the lower clutch to the plate 11. The rotation of the plate 11 in relation to the fixed part 12 with the toothed ring 10 causes the pinion 8 to roll and therefore causes a slow rotation of the planet-wheel bracket 5, this rotation being transmitted through the hub 4 to the shaft 1 (Fig. 5). If the outer arm 22b of the lever 22 is depressed, the lower clutch is released, whereupon the rotary movement of the handwheel is transmitted via the upper clutch through the plate 6 directly to the hub 4 (Figure 4).

As the friction shoes 14 wear down, the supports 13 can be suitably adjusted by means of the screws 16.

I claim:

In a speed-varying device, a shaft, a hub keyed upon said shaft, a bracket firmly connected with said hub, a handwheel casing rotatably mounted upon said hub and having a projection extending parallel to said shaft, a handle rotatably mounted upon said projection, a clutch plate firmly connected with said hub, another clutch plate rotatably mounted upon said hub, gears carried by said bracket and meshing with said other clutch plate, two friction members engaging separate clutch plates, resilient means maintaining said friction members in engagement with the clutch plates, two spaced pairs of cams connected with separate friction members for releasing said friction members, a two-armed lever pivoted upon said handle, a ram reciprocable in said casing projection, means operatively connecting said two-armed lever with said ram, rollers carried by said ram for selective engagement with any one of said two pairs of cams, said clutch plates being coupled by said resilient means when said rollers are out of engagement with said cams, the engagement of rollers with one of said two pairs of cams causing a transmission of movement from said casing through said other clutch plate, said gears, said bracket and said hub to said shaft, the engagement of rollers with the other one of said two pairs of cams causing a transmission of movement from said casing directly to said shaft through the first-mentioned clutch plate and said hub.

References Cited in the file of this patent

UNITED STATES PATENTS

| | | |
|---|---|---|
| 1,122,500 | Henry | Dec. 29, 1914 |
| 1,143,361 | Conover | June 15, 1915 |
| 1,348,690 | Barr | Aug. 3, 1920 |
| 1,484,565 | Riker | Feb. 19, 1924 |
| 2,306,476 | Diener | Dec. 29, 1942 |
| 2,382,110 | Sheldrick | Aug. 14, 1945 |
| 2,584,454 | Howard | Feb. 5, 1952 |
| 2,693,722 | Winther | Nov. 9, 1954 |